United States Patent
Ge et al.

(10) Patent No.: US 12,229,137 B1
(45) Date of Patent: Feb. 18, 2025

(54) CHECKPOINT AND RESTORE BASED STARTUP OF EXECUTOR NODES OF A DISTRIBUTED COMPUTING ENGINE FOR PROCESSING QUERIES

(71) Applicant: Databricks, Inc., San Francisco, CA (US)

(72) Inventors: Xinyang Ge, Kirkland, WA (US); Lixiang Ao, Sunnyvale, CA (US); Haonan Jing, San Jose, CA (US); Aaron Daniel Davidson, Berkeley, CA (US)

(73) Assignee: Databricks, Inc., San Francisco, CA (US)

( * ) Notice: Subject to any disclaimer, the term of this patent is extended or adjusted under 35 U.S.C. 154(b) by 0 days.

(21) Appl. No.: 18/412,438

(22) Filed: Jan. 12, 2024

(51) Int. Cl.
*G06F 16/2453* (2019.01)

(52) U.S. Cl.
CPC .. *G06F 16/24549* (2019.01); *G06F 16/24542* (2019.01)

(58) Field of Classification Search
CPC ............. G06F 16/24549; G06F 16/24542
See application file for complete search history.

(56) References Cited

U.S. PATENT DOCUMENTS

| | | | | |
|---|---|---|---|---|
| 2012/0265875 A1* | 10/2012 | Moran | ............... | H04L 41/0806 709/224 |
| 2017/0193012 A1* | 7/2017 | Gupta | ............... | G06F 16/2329 |
| 2017/0371761 A1* | 12/2017 | Piga | ................... | G06F 11/3604 |

OTHER PUBLICATIONS

Amazon. "Amazon Athena for Apache Spark." Amazon Web Services, Inc., Nov. 30, 2022, 7 pages, [Online] [Retrieved Aug. 27, 2024], Retrieved from the Internet <URL:https://aws.amazon.com/athena/spark/>.
Apache Spark. "Apache Spark: Unified Engine for Large-Scale Data Analytics." Apache Software Foundation, Jul. 9, 2013, 9 pages, [Online] [Retrieved Aug. 27, 2024], Retrieved from the Internet <URL:https://spark.apache.org/>.
Chalios, B. "Firecracker Snapshotting." Github.com, Jan. 5, 2021, 9 pages, [Online] [Retrieved Aug. 27, 2024], Retrieved from the Internet <URL:https://github.com/firecracker-microvm/firecracker/blob/main/docs/snapshotting/snapshot-support.md>.
Cloudera. "Apache Spark Guide." Cloudera, Inc., Version: CDH 6.3.x, Sep. 30, 2021, pp. 1-66.
Criu. "Checkpoint/Restore." Checkpoint/Restore In Userspace, May 12, 2017, 3 pages, [Online] [Retrieved Aug. 27, 2024], Retrieved from the Internet <URL:https://criu.org/Checkpoint/Restore>.

(Continued)

*Primary Examiner* — Cam Y T Truong
(74) *Attorney, Agent, or Firm* — Fenwick & West LLP

(57) ABSTRACT

A system performs efficient startup of executors of a distributed computing engine used for processing queries, for example, database queries. The system starts an executor node and processes a set of queries using the executor node to warm up the executor node. The system performs a checkpoint of the warmed-up executor node to create an image. The image is restored in the target executor nodes. The system may store a checkpoint image for each configuration of an executor node. The configuration is determined based on various factors including the hardware of the executor node, memory allocation of the processes, and so on. The user or restore based on checkpoint images improves efficiency of execution of the startup of executor nodes.

20 Claims, 10 Drawing Sheets

(56) References Cited

OTHER PUBLICATIONS

Criu. "Memory Dumping and Restoring." Checkpoint/Restore In Userspace, Feb. 5, 2019, 4 pages, [Online] [Retrieved Aug. 27, 2024], Retrieved from the Internet <URL:https://criu.org/Memory_dumping_and_restoring>.

Databricks. "Apache Spark: What is Apache Spark?" Databricks.com, Mar. 4, 2019, 6 pages, [Online] [Retrieved Aug. 27, 2024], Retrieved from the Internet <URL:https://www.databricks.com/glossary/what-is-apache-spark>.

Shin, W et al. "Fireworks: A Fast, Efficient, and Safe Serverless Framework Using VM-Level Post-JIT Snapshot." Euro Sys '22, Rennes, France, Apr. 5-8, 2022, pp. 663-677.

Virtuoso, A. "Anthony (9baf) Virtuoso's Post." LinkedIn, Nov. 30, 2022, 12 pages, [Online] [Retrieved Aug. 27, 2024], Retrieved from the Internet <URL:https://www.linkedin.com/posts/avirtuos_interactive-analytics-amazon-athena-for-activity- 7003770736473423872-NIPI>.

Wikipedia. "Apache Spark." Wikipedia: The Free Encyclopedia, Jun. 18, 2022, 9 pages, [Online] [Retrieved Aug. 27, 2024], Retrieved from the Internet <URL:https://en.wikipedia.org/wiki/Apache_Spark>.

\* cited by examiner

CHECKPOINT AND RESTORE BASED STARTUP OF EXECUTOR NODES OF A DISTRIBUTED COMPUTING ENGINE FOR PROCESSING QUERIES

TECHNICAL FIELD

This disclosure relates generally to query processing and more specially to improving query performance by using checkpoint/restore operations for performing startup of executor nodes of a distributed computing system for executing queries.

BACKGROUND

Query processing, for example, processing of database queries is performed using a distributed computing engine that includes multiple nodes. A node of the distributed computing engine may execute code written in a language such as Java™ that requires a runtime environment for processing instructions. The node of the distributed computing engine performs significant processing during startup, for example, by loading various classes, libraries, and building necessary data structures. In a highly distributed system, the number of nodes may be large, resulting in frequent startup of nodes. An inefficient startup of the runtime environment results in poor query performance and provides a poor user experience. For example, large latency in query response may appear as the system being down or very slow and may cause users to switch to a different system.

BRIEF DESCRIPTION OF THE DRAWINGS

The disclosed embodiments have other advantages and features which will be more readily apparent from the detailed description, the appended claims, and the accompanying figures (or drawings). A brief introduction of the figures is below.

Figure 1:
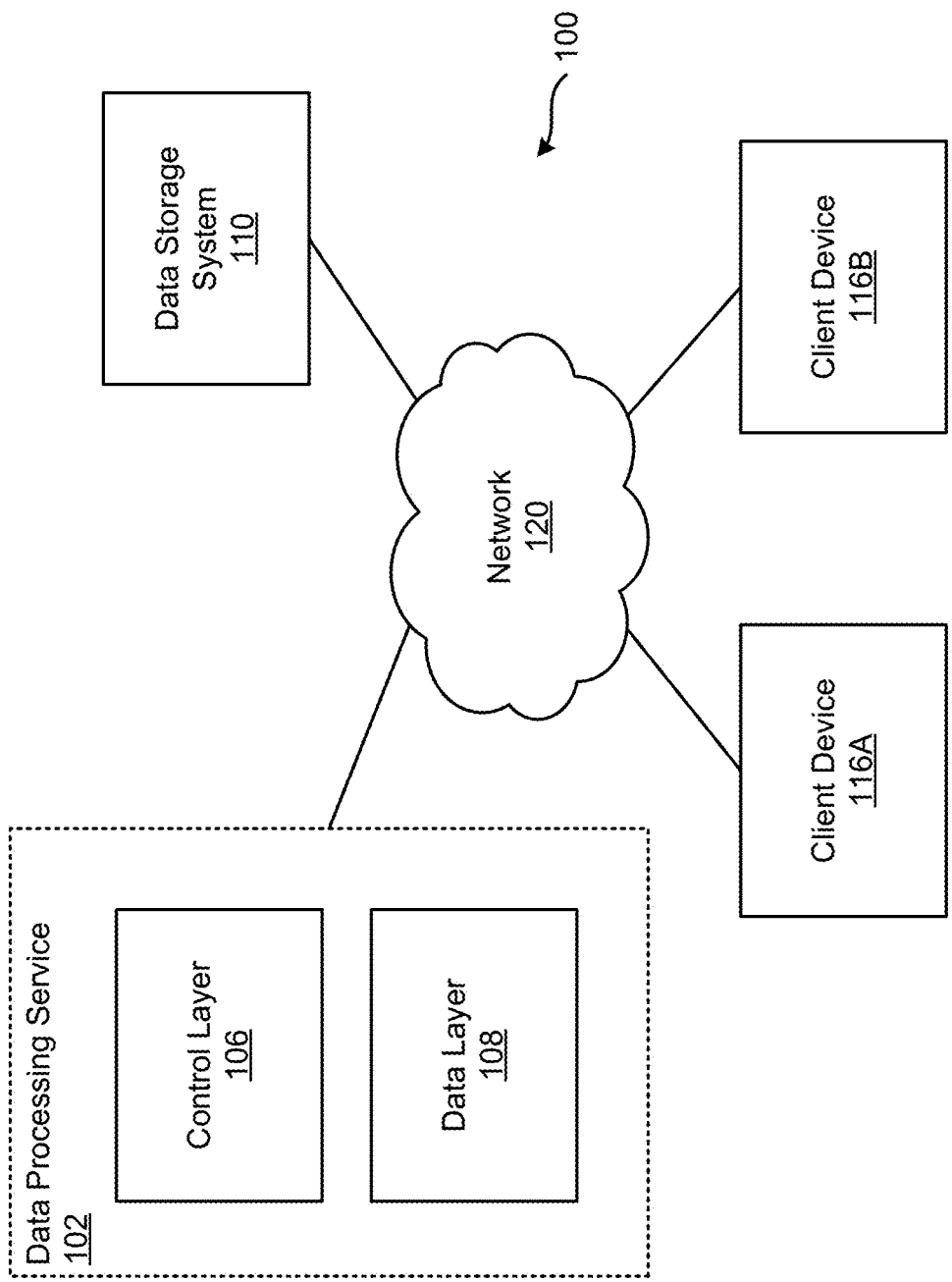
FIG. 1 is a high-level block diagram of a system environment for a data processing service, in accordance with an embodiment.

The figures depict various embodiments of the present invention for purposes of illustration only. One skilled in the art will readily recognize from the following discussion that alternative embodiments of the structures and methods illustrated herein may be employed without departing from the principles described herein.

DETAILED DESCRIPTION

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (computer-readable medium or method) for purposes of illustration only. One skilled in the art will readily recognize from the following description that alternative embodiments of the structures and methods illustrated herein may be employed without departing from the principles described herein.

Overview

The disclosed configurations provide a method (and/or a computer-readable medium or computer system) for efficient startup of executors of a distributed computing engine used for processing queries, for example, database queries. The system starts an executor node and processes a set of queries using the executor node. The processing of the queries causes the necessary instructions, for example, classes including code for processing various types of queries to be loaded in memory, variables to be initialized, data structures to be created, and code compiled to generate native instructions if needed. The system performs a checkpoint of the executor node to create a checkpoint image. The system sends the checkpoint image to various target executor nodes. The image is restored in the target executor nodes. Since the checkpoint image was created using a pre-warmed executor node that loaded various types of data that is created or loaded at startup time, the target executor nodes preload the necessary information that is created during startup. As a result, the startup of the target executor nodes is significantly faster than the startup of a typical executor node using conventional techniques. For example, an improvement of an order of magnitude was experimentally observed wherein an executor node using the disclosed techniques performed the startup in few seconds whereas startup using conventional techniques took a couple of minutes. A checkpoint image may also be referred to herein as an image, or an executor image.

The data processing service 102 is a service for managing and coordinating data processing services (e.g., database services) to users of client devices 116. The data processing service 102 may manage one or more applications that users of client devices 116 can use to communicate with the data processing service 102. Through an application of the data processing service 102, the data processing service 102 may receive requests (e.g., database queries) from users of client devices 116 to perform one or more data processing functionalities on data stored, for example, in the data storage system 110. The requests may include query requests, analytics requests, or machine learning and artificial intelligence requests, and the like, on data stored by the data storage system 110. The data processing service 102 may provide responses to the requests to the users of the client devices 116 after they have been processed.

In one embodiment, as shown in the system environment 100 of FIG. 1, the data processing service 102 includes a control layer 106 and a data layer 108. The components of the data processing service 102 may be configured by one or more servers and/or a cloud infrastructure platform. In one embodiment, the control layer 106 receives data processing requests and coordinates with the data layer 108 to process the requests from client devices 116. The control layer 106 may schedule one or more jobs for a request or receive requests to execute one or more jobs from the user directly through a respective client device 116. The control layer 106 may distribute the jobs to components of the data layer 108 where the jobs are executed.

The control layer 106 is additionally capable of configuring the clusters in the data layer 108 that are used for executing the jobs. For example, a user of a client device 116 may submit a request to the control layer 106 to perform one or more queries and may specify that four clusters on the data layer 108 be activated to process the request with certain memory requirements. Responsive to receiving this information, the control layer 106 may send instructions to the data layer 108 to activate the requested number of clusters and configure the clusters according to the requested memory requirements.

The data layer 108 includes multiple instances of clusters of computing resources that execute one or more jobs received from the control layer 106. Accordingly, the data layer 108 may include a cluster computing system for executing the jobs. An example of a cluster computing system is described in relation to FIG. 4. In one instance, the clusters of computing resources are virtual machines or virtual data centers configured on a cloud infrastructure platform. In one instance, the control layer 106 is configured as a multi-tenant system and the data layers 108 of different tenants are isolated from each other. In one instance, a serverless implementation of the data layer 108 may be configured as a multi-tenant system with strong virtual machine (VM) level tenant isolation between the different tenants of the data processing service 102. Each customer represents a tenant of a multi-tenant system and shares software applications and also resources such as databases of the multi-tenant system. Each tenant's data is isolated and remains invisible to other tenants. For example, a respective data layer instance can be implemented for a respective tenant. However, it is appreciated that in other embodiments, single tenant architectures may be used.

The data layer 108 thus may be accessed by, for example, a developer through an application of the control layer 106 to execute code developed by the developer. In one embodiment, a cluster in a data layer 108 may include multiple worker nodes that execute multiple jobs in parallel. Responsive to receiving a request, the data layer 108 divides the cluster computing job into a set of worker jobs, provides each of the worker jobs to a worker node, receives worker job results, stores job results, and the like. The data layer 108 may include resources not available to a developer on a local development system, such as powerful computing resources to process very large data sets. In this manner, when the data processing request can be divided into jobs that can be executed in parallel, the data processing request can be processed and handled more efficiently with shorter response and processing time.

The data storage system 110 includes a device (e.g., a disc drive, a hard drive, a semiconductor memory) used for storing database data (e.g., a stored data set, portion of a stored data set, data for executing a query). In one embodiment, the data storage system 110 includes a distributed storage system for storing data and may include a commercially provided distributed storage system service. Thus, the data storage system 110 may be managed by a separate entity than an entity that manages the data processing service 102 or the data storage system 110 may be managed by the same entity that manages the data processing service 102.

The client devices 116 are computing devices that display information to users and communicates user actions to the systems of the system environment 100. While two client devices 116A, 116B are illustrated in FIG. 1, in practice many client devices 116 may communicate with the systems of the system environment 100. In one embodiment, client devices 116 of the system environment 100 may include some or all of the components (systems (or subsystems)) of a computer system 1000 as described with FIG. 10.

In one embodiment, a client device 116 executes an application allowing a user of the client device 116 to interact with the various systems of the system environment 100 of FIG. 1. For example, a client device 116 can execute a browser application to enable interaction between the client device 116 and the data processing service 102 via the network 120. In another embodiment, the client device 116 interacts with the various systems of the system environment 100 through an application programming interface (API) running on a native operating system of the client device 116, such as IOS® or ANDROID™

Data Storage System

Figure 2:
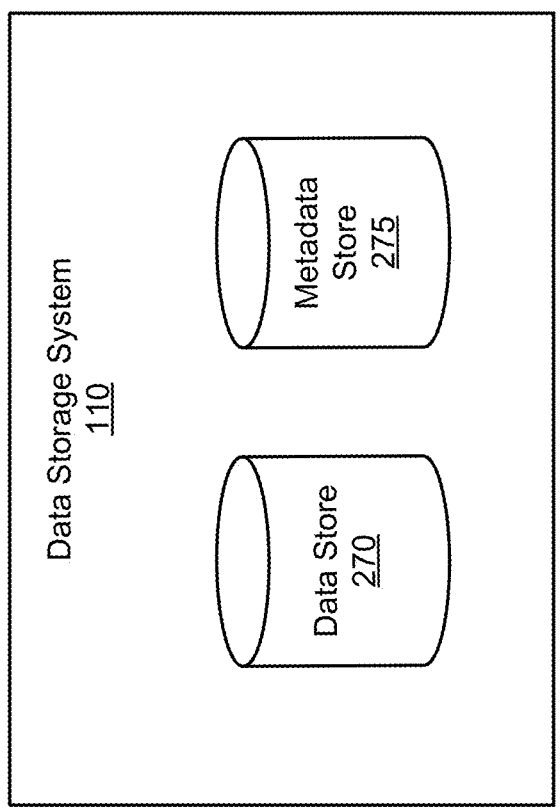
FIG. 2 illustrates a block diagram of an architecture of the data storage system, in accordance with an embodiment.

FIG. 2 illustrates a block diagram of an architecture of the data storage system 110, in accordance with an embodiment. As illustrated in FIG. 2, the data storage system 110 includes a data store 270 and a metadata store 275. The data storage system 110 may have multiple instances of the data store 270 and the metadata store 275, each dedicated to storing data for a tenant of the data processing service 102. In one embodiment, the data store 270 stores data in a format of a data table. A data table may include a set of records, where each record may include values for one or more features or keys. A feature may represent a measurable piece of data that can be used for analysis, such as, login account, timestep, etc. A feature may refer to any characteristic of the data that can be associated with one or more values of various data types, such as discrete or continuous values, string values, and the like. In one embodiment, the records may span across multiple rows of the data table and the features may span across multiple columns of the data table. In other embodiments, the records may span across multiple columns and the features may span across multiple rows. For example, a data table associated with a company may include a plurality of records each corresponding to a login instance of a respective user to a website, where each record includes values for a set of features including user login account, timestamp of attempted login, whether the login was successful, and the like.

In one embodiment, a data table may be stored in the data store 270 in conjunction with metadata stored in the metadata store 275. As described above, the metadata store 275 may include one or more metadata files for a data table. In some embodiments, the metadata store 275 stores metadata in the form of one or more transaction logs. A transaction log for a data table is a log recording a sequence of transactions that were performed on the data table. A transaction may perform one or more changes to a data table that may include removal, modification, or addition of records and features to the data table, and the like. For example, a transaction may be initiated responsive to a request from a user of the client device 116. As another example, a transaction may be initiated according to policies of the data processing service 102. Thus, a transaction may write one or more changes to data tables stored in the data storage system 110. The metadata in the transaction log may record removal, update, or addition of data files to a data table.

Control Layer

Figure 3:
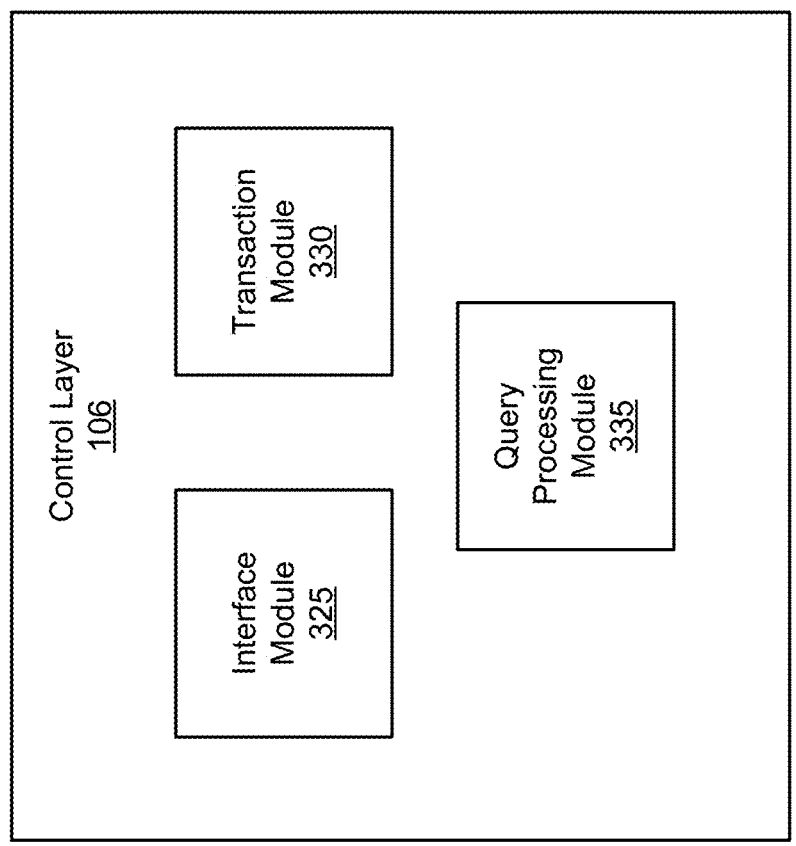
FIG. 3 is a block diagram of an architecture of a control layer, in accordance with an embodiment.

FIG. 3 is a block diagram of an architecture of a control layer 106, in accordance with an embodiment. In one embodiment, the data processing service 102 includes an interface module 325, a transaction module 330, and a query processing module 335. The modules 325, 330, and 335 may be structured for execution by a computer system, e.g., 1000 having some or all of the components as described in FIG. 10, such that the computer system 1000 operates in a specified manner as per the described functionality.

The interface module 325 provides an interface and/or a workspace environment where users of client devices 116 (e.g., users associated with tenants) can access resources of the data processing service 102. For example, the user may retrieve information from data tables associated with a tenant, submit data processing requests such as query requests on the data tables, through the interface provided by the interface module 325. The interface provided by the interface module 325 may include notebooks, libraries, experiments, queries submitted by the user. In one embodiment, a user may access the workspace via a user interface (UI), a command line interface (CLI), or through an application programming interface (API) provided by the interface module 325.

The transaction module 330 receives requests to perform one or more transaction operations from users of client devices 116. As described in conjunction in FIG. 2, a request to perform a transaction operation may represent one or more requested changes to a data table. For example, the transaction may be to insert new records into an existing data table, replace existing records in the data table, delete records in the data table. As another example, the transaction may be to rearrange or reorganize the records or the data files of a data table to, for example, improve the speed of operations, such as queries, on the data table. For example, when a particular version of a data table has a significant number of data files composing the data table, some operations may be relatively inefficient. Thus, a transaction operation may be a compaction operation that combines the records included in one or more data files into a single data file.

The query processing module 335 receives and processes queries that access data stored by the data storage system 110. The query processing module 335 may reside in the control layer 106. The queries processed by the query processing module 335 are referred to herein as database queries. The database queries are specified using a declarative database query language such as the SQL. The query processing module 335 compiles a database query specified using the declarative database query language to generate executable code that is executed. The query processing module 335 may encounter runtime errors during execution of a database query and returns information describing the runtime error including an origin of the runtime error representing a position of the runtime error in the database query. In one embodiment, the query processing module 335 provides one or more queries to appropriate clusters of the data layer 108 and receives responses to the queries from clusters in which the queries are executed.

Figure 4:
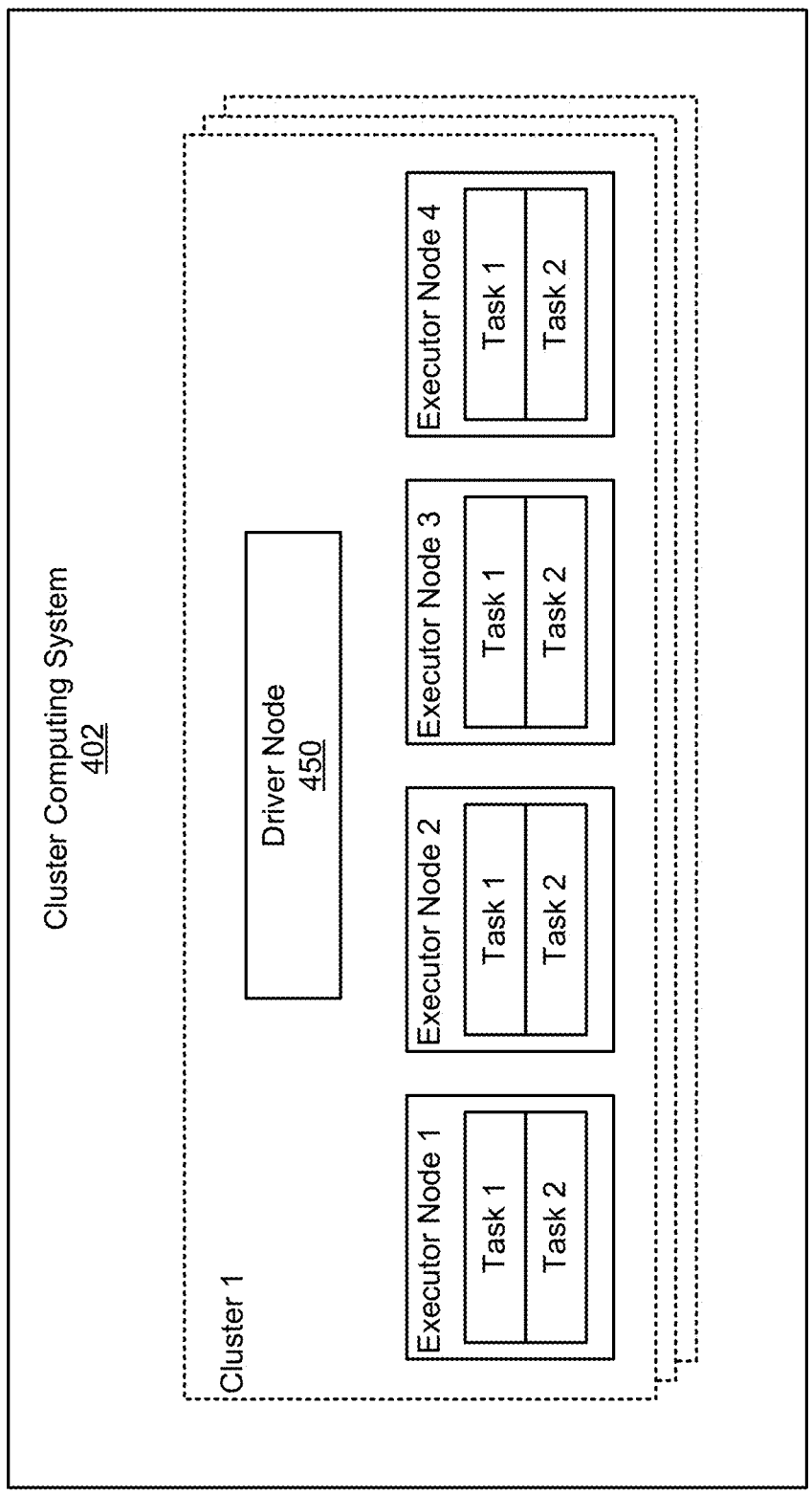
FIG. 4 is a block diagram of an architecture of a cluster computing system, in accordance with an embodiment.

FIG. 4 is a block diagram of an architecture of a cluster computing system 402 of the data layer 108, in accordance with an embodiment. In some embodiments, the cluster computing system 402 of the data layer 108 includes driver node 450 and worker pool including multiple executor nodes. The nodes may be structured for execution by a computer system, e.g., 1000 having some or all of the components as described in FIG. 10, such that the computer system 1000 operates in a specified manner as per the described functionality.

The driver node 450 receives one or more jobs for execution, divides a job into job stages, and provides job stages to executor nodes, receives job stage results from the executor nodes of the worker pool, and assembles job stage results into complete job results, and the like. In one embodiment, the driver node receives a request to execute one or more queries from the query processing module 335. The driver node 450 may compile a database query and generate an execution plan. The driver node 450 distributes the query information including the generated code to the executor nodes. The executor nodes execute the query based on the received information.

The worker pool can include any appropriate number of executor nodes (e.g., 4 executor nodes, 12 executor nodes, 256 executor nodes). Each executor node in the worker pool includes one or more execution engines (not shown) for executing one or more tasks of a job stage. In one embodiment, an execution engine performs single-threaded task execution in which a task is processed using a single thread of the CPU. The executor node distributes one or more tasks for a job stage to the one or more execution engines and provides the results of the execution to the driver node 410. According to an embodiment, an executor node executes the generated code for the database query for a particular subset of data that is processed by the database query. The executor nodes execute the query based on the received information from the driver node 450.

Figure 5:
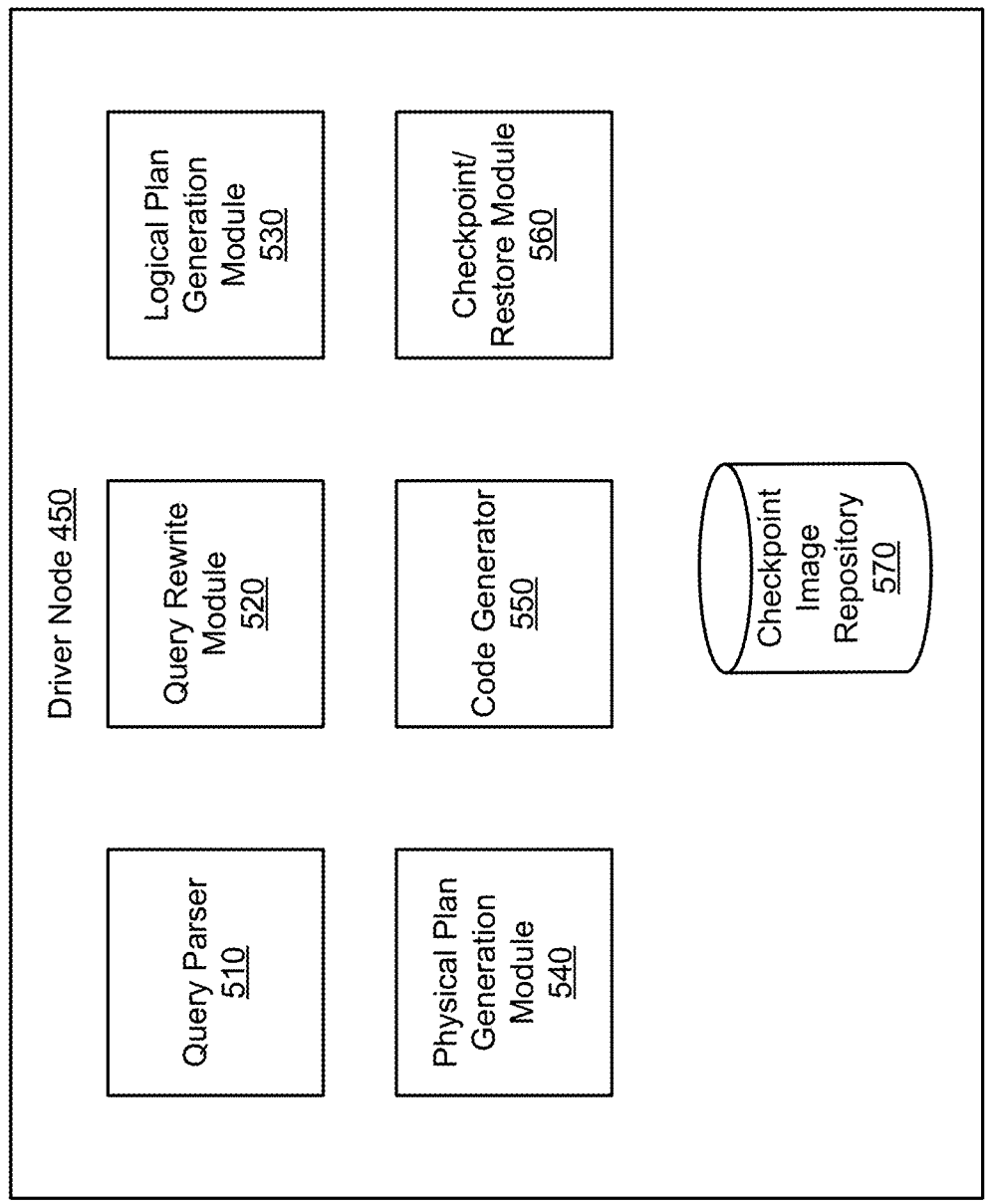
FIG. 5 is an example illustration of rebalancing stateful tasks across executors of the cluster computing system, in accordance with an embodiment.

FIG. 5 is a block diagram of an architecture of a driver node 450, in accordance with an embodiment. In one instance, the driver node 450 includes a query parser 510, a query rewrite module 520, a logical plan generation module 530, a physical plan generation module 540, a code generator module 550, a checkpoint/restore module 560, and a checkpoint image repository 570. The modules and nodes may be structured for execution by a computer system, e.g., 1000 having some or all of the components as described in FIG. 10, such that the computer system 1000 operates in a specified manner as per the described functionality.

The query parser 510 receives a database query for processing and parses the database query. The database query is specified using a declarative database query language such as SQL. The query parser 510 parses the database query to identify various tokens of the database query and build a data structure representation of the database query. The data structure representation identifies various components of the database query, for example, any SELECT expressions that are returned by the database query, tables that are input to the query, a conditional clause of the database query, a group by clause, and so on.

The query rewrite module 520 performs transformations of the database query, for example, to improve the execution of the query. The improvement may be in terms of execution time, memory utilization, or other resource utilization. A database query may process one or more tables that store a significant number of records that are processed by the database query. Since the declarative database query language does not specify the procedure for determining the result of the database query, there are various possible procedures for executing the database query.

The logical plan generation module 530 generates a logical plan for the database query. The logical plan includes representation of the various steps that need to be executed for processing the database query. According to an embodiment, the logical plan generation module 530 generates an unresolved logical plan based on the transformed query graph representation. Various relation names (or table names) and column names may not be resolved in an unresolved logical plan. The logical plan generation module 530 generates a resolved logical plan from the unresolved logical plan by resolving the relation names and column names in the unresolved logical plan. The logical plan generation module 530 further optimizes the resolved logical plan to obtain an optimized logical plan.

The physical plan generation module 540 generates a physical plan from the logical plan generated by the logical plan generation module 530. The physical plan specifies details of how the logical plan is executed by the data processing service 102. The physical plan generation module 540 may generate different physical plans for the same logical plan and evaluate each physical plan using a cost model to select the optimal physical plan for execution. The physical plan further specifies details of various operations of the logical plan. As an example, if the logical plan includes a join operator, the physical plan may specify the type of join that should be performed for implementing the join operator.

The code generator module 550 generates code representing executable instructions for implementing the physical plan for executing a database query. The generated code includes a set of instructions for each operator specified in the execution plan. The generated code is specified using a programming language that may be compiled and executed.

The checkpoint/restore module 560 sends instructions to executor nodes for performing a checkpoint or a restore operation. The checkpoint operation results in creation of a checkpoint image. The checkpoint images created by the checkpoint operations are stored in the checkpoint image repository 570. The checkpoint image repository 570 may be stored locally in the driver node 450 or may be implemented in a cloud platform. According to an embodiment, the checkpoint repository is stored on the executor node. For example, a checkpoint may be created on an executor node on-demand, and then repeatedly used to handle subsequent queries such that each query is processed by a freshly-restored container for security reasons.

The checkpoint/restore module 560 accesses the appropriate image for a given configuration of executor nodes from the checkpoint image repository 570 for performing a restore operation.

According to an embodiment, the executor node performs checkpoints of user level processes. For example, the executor node may run a set of user level processes within a container and the checkpoint/restore module 560 performs a checkpoint of all the user level processes running in the container. A container represents a unit of software that packages code for an application and all its dependencies so that the application runs efficiently in a computing environment.

A container is distinct from a virtual machine (VM) that emulates a physical hardware such that a single physical server can run multiple VMs, each acting as a distinct server. A VM includes a copy of an operating system, the application, necessary binaries and libraries, and so on. A container takes up less space than a VM. An image stores all the data needed to run the application including the code, libraries, settings, and so on. State of the art checkpoint images typically are tens of MBs in size as opposed to VM images that can be several GBs in size. As a result, container level checkpoint/restore operation is significantly more efficient compares to a VM level checkpoint/restore operation.

Furthermore, checkpointing user level processes provides higher level of security comparted to VM level checkpointing since kernel level data is not stored in the image and is therefore not restored in the executor nodes. This allows differences in execution of the container when restored in different executor nodes, for example, due to differences in random numbers generated by kernel level instructions. For example, random numbers may be used to generate secure keys used by the containers and if the same random numbers are generated by different instances of the container restored across multiple executor nodes, the same secure key may be generated across different instances of the container, thereby compromising security. Furthermore, an executor node may use address space randomization (ASLR) techniques for computer security that randomly arranges the address space positions of specific data areas of processes. VM level checkpoint/restore is likely to result in the same set of random numbers being generated across multiple executor nodes, thereby compromising the security offered by the ASLR techniques.

The code of executor node avoids host specific attributes such as hostname, IP addresses, and so on are avoided in the image, region specific information is avoided, for example, certificates used for authentication, time zone information, language specific information, and so on are avoided. The code of an executor node is structured so that the above information is stored in variables. After a restore operation is performed on an executor node, the above information is bound to their respective variables. If the executor code needs to access host information, the code is structured to access localhost rather than a specific host name. This results in generating a checkpoint image that is usable across executor nodes. For example, when the checkpoint image is restored on a new executor node, the hostname and IP addresses are available and can be accessed using appropriate variables.

Startup Based on Checkpoint/Restore of Executor Nodes

Figure 6:
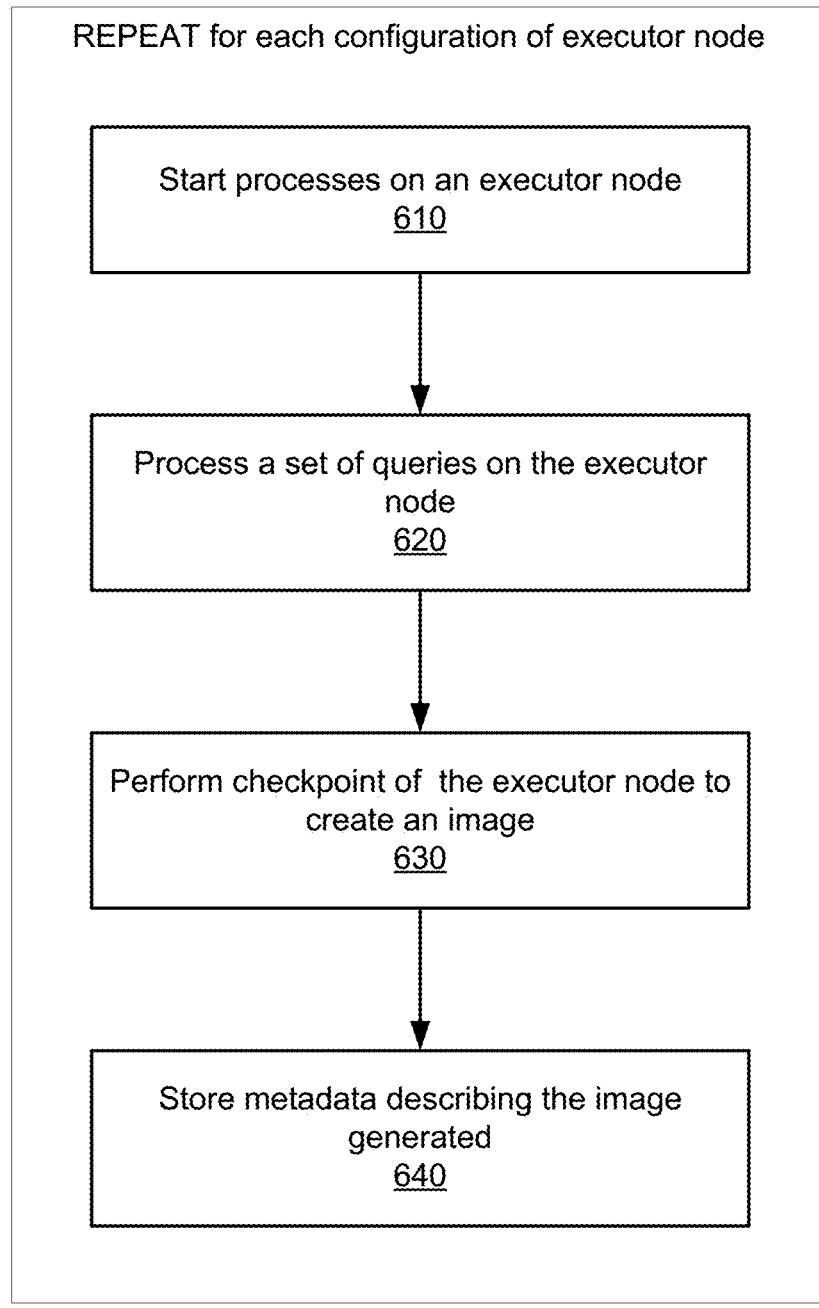
FIG. 6 shows a flowchart of a process for performing checkpoint of an executor node to generate an image, in accordance with an embodiment.
Figure 7:
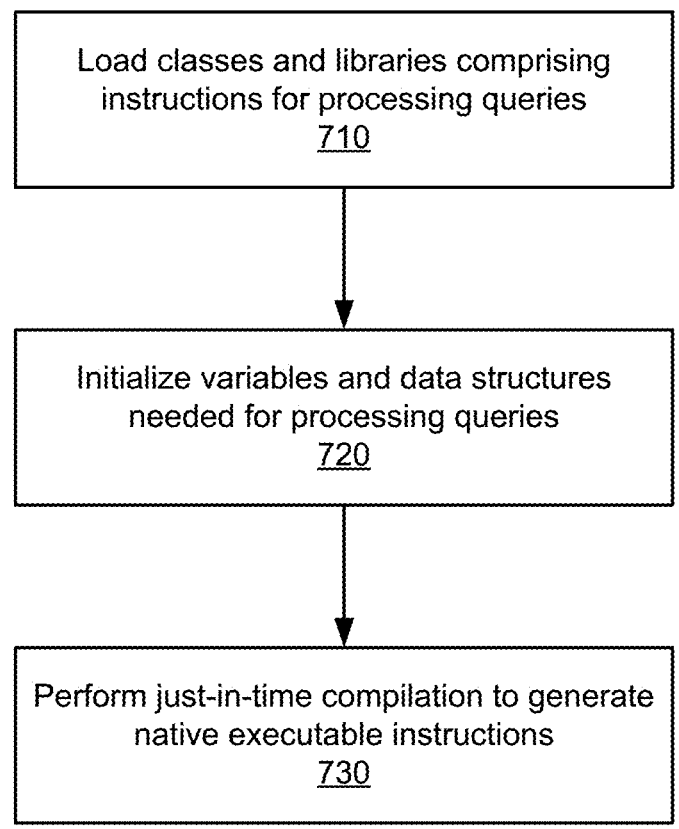
FIG. 7 shows a flowchart of a startup process of an executor node, in accordance with an embodiment.
Figure 8:
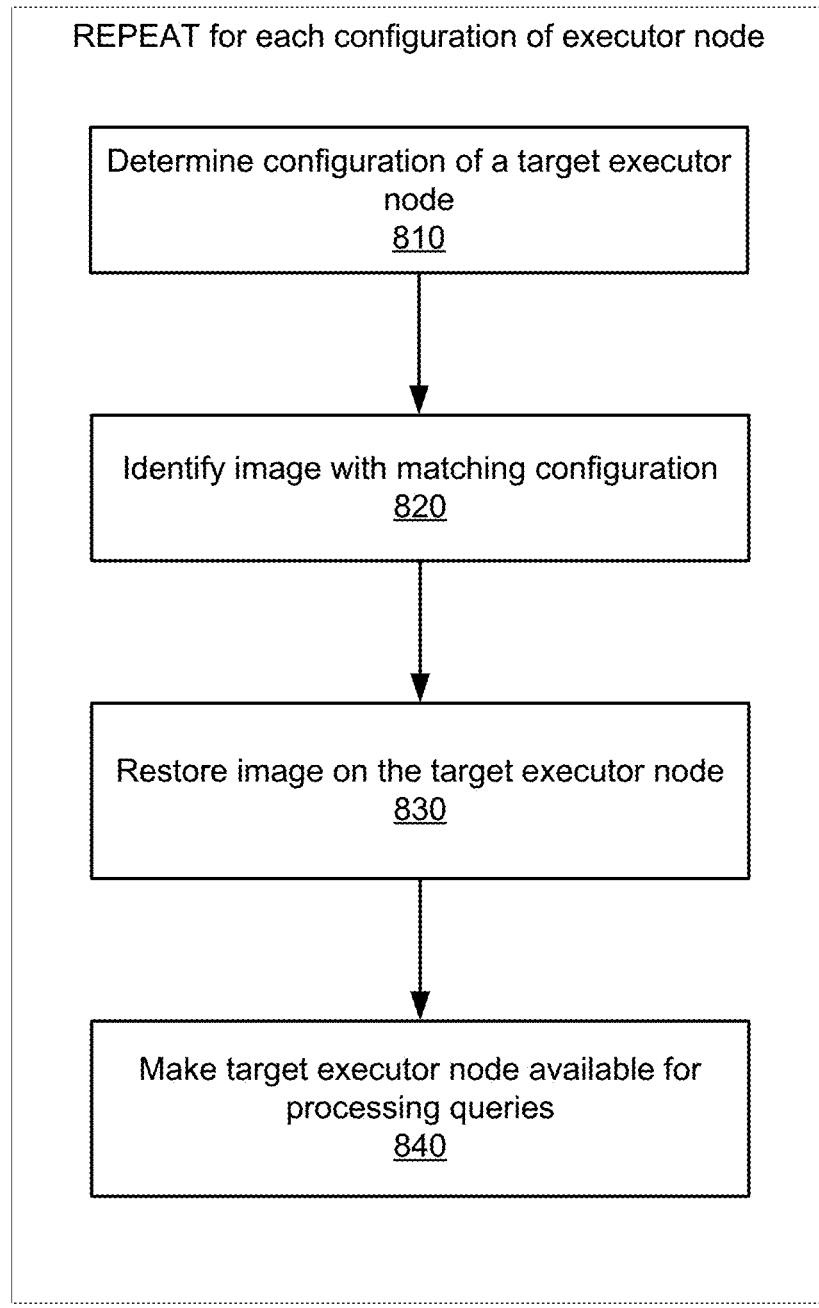
FIG. 8 shows a flowchart of a process for performing restore of one or more executor nodes for performing efficient startup of the executor nodes, in accordance with an embodiment.

FIGS. 6-8 show flowcharts of processes used for performing efficient startup of an executor node, in accordance with an embodiment. The process shown in FIGS. 6-8 may be performed by one or more components (e.g., the checkpoint/restore module 560 of the driver node 450) of a data processing system/service (e.g., the data processing service 102). Other entities may perform some or all of the steps in FIG. 6. The data processing service 102 as well as the other entities may include some or of the component of the machine (e.g., computer system) described in conjunction with FIG. 10. Embodiments may include different and/or additional steps or perform the steps in different orders.

FIG. 6 shows a flowchart of a process for performing checkpoint of an executor node to generate an image, in accordance with an embodiment. The executor starts 610 processes for running queries, for example, the runtime environment for running instructions for processing queries. The queries may represent user requests that result in execution of database queries. The driver node 450 processes 620 a set of queries on the executor node. These queries include sample queries of various types, thereby exercising different parts of the code and invoke various possible libraries. The processing of queries causes the executor node to perform various operations as described in the flowchart shown in FIG. 7 and described in connection with FIG. 7.

The checkpoint/restore module 560 performs 630 a checkpoint of the executor node. The checkpoint/restore module 560 may perform the checkpoint by sending instructions to the executor node to checkpoint the processes executing the queries, for example, the runtime engine executing the instructions such as the Java™ runtime. The checkpoint/restore module 560 stores 640 metadata describing the image generated. For example, the checkpoint/restore module 560 may generate multiple checkpoints, one for each type of hardware used by an executor node. The checkpoint/restore module 560 may store metadata describing the type of executor node for which the image was generated.

FIG. 7 shows a flowchart of a startup process of an executor node, in accordance with an embodiment. The steps shown in FIG. 7 may correspond to the step 610 of the flowchart shown in FIG. 6. The steps shown in FIG. 7 may be performed in an order different from that indicated herein, for example, a step may be performed concurrently with other steps.

The executor node loads 710 classes and libraries comprising instructions for processing queries. Some classes and libraries may be loaded as the queries are executed by the executor node. For example, instructions for processing a specific query may invoke a function defined in a particular library, thereby causing that library to be loaded. A typical executor node may load thousands of libraries for processing queries. The executor node initializes 720 variables and data structures needed for processing queries. For example, some variables may represent state needed for processing the queries. Running the queries triggers the required initializations and creation of data structures.

The executor node further identifies hotspots in the code processing the queries and performs just-in-time compilation of the identified code to generate native executable instructions. For example, the code used for processing queries may be implemented using a language such as Java™ that generates byte code that is interpreted using a runtime environment. The execution of byte code may be slow since it is interpreted. As a result, the runtime environment of the executor node identifies frequently executed code as hotspots and further compile the hotspot code into native executable instructions. Execution of code compiled into native executable instructions is more efficient compared to the same code compiled into byte code and interpreted using a runtime engine. A typical executor node may generate several megabytes of machine code by performing just-in-time compilation of hotspots.

The image generated by the checkpoint operation stores the information generated during the process illustrated in FIG. 7 including the classes and libraries loaded, native code obtained by just-in-time compilation, variables, register values, files that were opened, any offsets determined in the files, state of each thread, state of the heap (represented as pages of the heap), state of the stack, and so on.

The steps illustrated in FIG. 7 cause the executor node to perform the processing that needs to be performed by each executor node. Accordingly, without using the technique disclosed herein, significant overhead (e.g., approximately two minutes of computational overhead) is incurred by each executor node during startup. Generating an image from the executor node that has already performed these causes the generated information to be stored in the image. This image can be restored in any target executor node and provides all the information and loading the information rather than having to perform the computation described in the process illustrated in FIG. 7. Although the techniques are described in connection with executor nodes implemented using Java™ code, the techniques are applicable to any other implementation of executor nodes.

The executor node may perform optimizations to reduce the amount of memory that is stored in an image as a result of the checkpoint operation. For example, the executor node may remove one or more processes that occupy large memory after the queries are processed to reduce the heap memory. Furthermore, the executor node performs a garbage collection after processing the queries to remove unused pages from the memory. Reducing the size of the image improves the efficiency of storing the image as well as transmitting the image over network as well as improves the time taken to perform the checkpoint and restore operations.

FIG. 8 shows a flowchart of a process for performing restore of one or more executor nodes for performing efficient startup of the executor nodes, in accordance with an embodiment. The steps 810, 820, and 830 may be executed multiple times, for example, once for each target executor node being used for executing queries. The checkpoint/restore module 560 determines 810 the configuration (or the environment) of the executor node, for example, the type of hardware running the executor node. For example, different configurations of executor nodes may use different types of CPUs that support different instruction sets. Different executor nodes may use different amount of memory, for example, some executor nodes may allocate larger heap compared to other executor nodes. Each such executor node is treated as a different configuration for which a different image is generated. A different image is generated for each such configuration of executor nodes. The checkpoint/restore module 560 identifies 820 an image matching the configuration of the executor node. The checkpoint/restore module 560 restores 830 the image on the target executor node. The checkpoint/restore module 560 makes 840 the target executor node available for processing queries.

Figure 9:
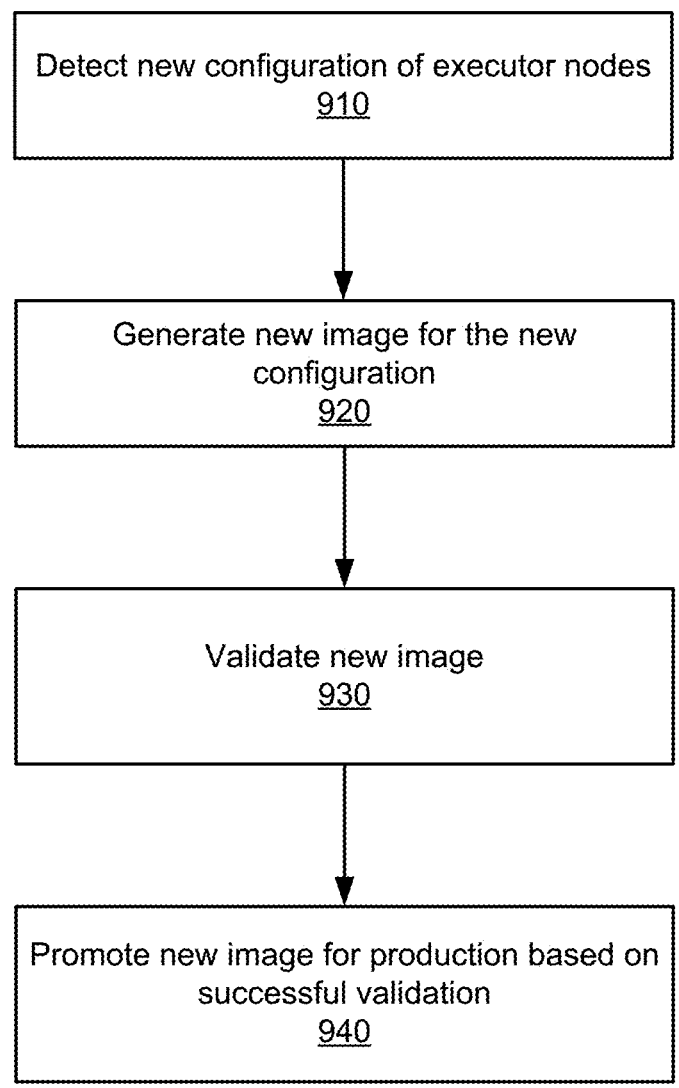
FIG. 9 shows a flowchart of a process of continuous integration/continuous delivery for images for new executor configurations, in accordance with an embodiment.

FIG. 9 shows a flowchart of a process of continuous integration/continuous delivery for images for new executor configurations, in accordance with an embodiment. The checkpoint/restore module 560 detects 910 a new configuration of executor nodes for which an image has not been previously created and stored. New configurations of executor nodes may be detected by querying information describing various executor nodes. The checkpoint/restore module 560 checks the various executor configuration attributes such as versions of various systems relevant to query processing that are installed on an executor node, environment attributes, hardware configuration, and so on. A signature based on the executor configuration may be generated and compared against signatures of executor nodes corresponding to existing images to determine whether the detected executor configuration is new (i.e., an executor configuration for which an image hasn't been generated so far and stored in the checkpoint image repository 570).

The checkpoint/restore module 560 performs the processing shown in FIG. 6 to generate 920 a new image for the new configuration. The checkpoint/restore module 560 provides the details of the new configuration of the executor so that an example executor node is started and warmed up by processing images so that a new image for the new executor configuration can be created by checkpointing.

The new image is validated 930. For example, certain tests may be executed using an executor started using the new image. The testing and validation ensure that the new image can be used to successfully startup an executor node having appropriate configuration and the new executor can be added to a cluster and used for processing queries. If the validation and testing is successful, the new image is promoted 940 for use in a production environment.

According to an embodiment, the checkpoint image repository maps each checkpoint image to a signature based on the various attributes that characterize the configuration of the executor node including hardware attributes, operating system attributes, and so on. When an executor node needs to be started, the checkpoint/restore module 560 determines the configuration of the executor node; determines a signature based on the configuration of the executor node; identifies a checkpoint image mapped to that signature; and uses the checkpoint image to restore the executor node.

According to an embodiment, the executor node tracks all random numbers used by the code. The random numbers are regenerated after the image is restored on the executor node, for example, the random number value may be replaced with new random values generated on executor node on which the restore was performed. This way different executor nodes restored using the same image are able to use different set of random numbers.

The checkpoint/restore module 560 may implement a restore operation for executor nodes that loads all pages in memory when the restore operation in performed. In some embodiments, the system implements a restore operation that lazily loads pages as they are needed while processing queries. According to some embodiments, the checkpoint/restore module 560 detects whether there are new configurations of executor nodes and generates corresponding images.

According to an embodiment, the checkpoint/restore module 560 generates multiple checkpoint images for each distinct configuration of executor node. The different checkpoint images have different address space layouts by performing address space layout randomization. For example, the checkpoint/restore module 560 may generate 64 distinct images each image having a different address space layout. The checkpoint/restore module 560 may use different restore strategies for using the different checkpoint images for the same configuration of the executor node. For example, the checkpoint/restore module 560 may use a particular image to restore a particular executor and after a predetermined interval of time, shutdown the executor node and restore a different image. As another strategy, the checkpoint/restore module 560 uses a new image for the executor, every time the executor needs to be restarted, for example, as a result of container crash. The checkpoint/restore module 560 may switch to a different image for an executor node if a suspicious activity is detected using that executor node, for example, an attempt to access sensitive information on that executor node. According to an embodiment, if a suspicious activity is detected, the executor node is restarted using conventional startup process that does not restore an image but runs the executable instructions of each user level process to start the process.

According to an embodiment, an executor node performs runtime re-randomization of the address space after the checkpoint image is restored. During the checkpoint stage, the executor code is run using a CPU emulator. During the warm-up process when the queries are executed using the executor node, the emulated CPU instructions are instrumented to track how pointers are propagated in the process' address space. When restoring the checkpoint, the executor node reshuffles the memory segments (e.g., library images, stack and heap) and fixes up all the tracked pointers so that they point to the new locations within the address space.

Figure 10:
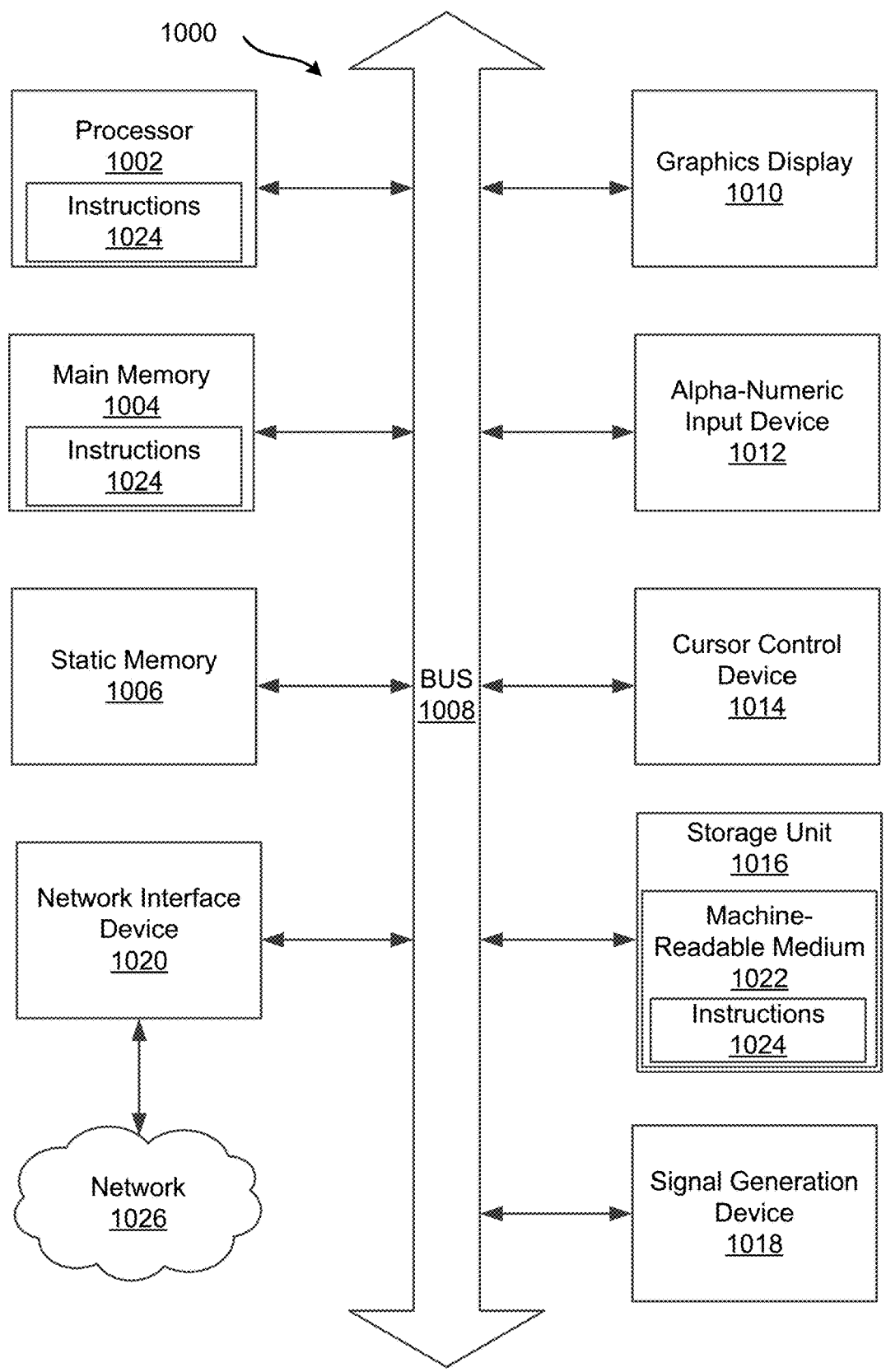
FIG. 10 is a block diagram illustrating an example machine to read and execute computer readable instructions, in accordance with an embodiment.

Turning now to FIG. 10, illustrated is an example machine to read and execute computer readable instructions, in accordance with an embodiment. Specifically, FIG. 10 shows a diagrammatic representation of the data processing service 102 (and/or data processing system) in the example form of a computer system 1000. The computer system 1000 can be used to execute instructions 1024 (e.g., program code or software) for causing the machine to perform any one or more of the methodologies (or processes) described herein. In alternative embodiments, the machine operates as a standalone device or a connected (e.g., networked) device that connects to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a smartphone, an internet of things (IoT) appliance, a network router, switch or bridge, or any machine capable of executing instructions 824 (sequential or otherwise) that specify actions to be taken by that machine. Further, while only a single machine is illustrated, the term "machine" shall also be taken to include any collection of machines that individually or jointly execute instructions 1024 to perform any one or more of the methodologies discussed herein.

The example computer system 1000 includes one or more processing units (generally processor 1002). The processor 1002 is, for example, a central processing unit (CPU), a graphics processing unit (GPU), a digital signal processor (DSP), a controller, a state machine, one or more application specific integrated circuits (ASICs), one or more radio-frequency integrated circuits (RFICs), or any combination of these. The processor executes an operating system for the computing system 800. The computer system 1000 also includes a main memory 1004. The computer system may include a storage unit 1016. The processor 1002, main memory 1004, and the storage unit 1016 communicate via a bus 1008.

In addition, the computer system 1000 can include a static memory 1006, a graphics display 1010 (e.g., to drive a plasma display panel (PDP), a liquid crystal display (LCD), or a projector). The computer system 1000 may also include alphanumeric input device 1012 (e.g., a keyboard), a cursor control device 1014 (e.g., a mouse, a trackball, a joystick, a motion sensor, or other pointing instrument), a signal generation device 1018 (e.g., a speaker), and a network interface device 1020, which also are configured to communicate via the bus 1008.

The storage unit 1016 includes a machine-readable medium 1022 on which is stored instructions 1024 (e.g., software) embodying any one or more of the methodologies or functions described herein. For example, the instructions 1024 may include instructions for implementing the functionalities of the transaction module 330. The instructions 1024 may also reside, completely or at least partially, within the main memory 1004 or within the processor 1002 (e.g., within a processor's cache memory) during execution thereof by the computer system 1000, the main memory 1004 and the processor 1002 also constituting machine-readable media. The instructions 1024 may be transmitted or received over a network 1026, such as the network 120, via the network interface device 1020.

While machine-readable medium 1022 is shown in an example embodiment to be a single medium, the term "machine-readable medium" should be taken to include a single medium or multiple media (e.g., a centralized or distributed database, or associated caches and servers) able to store the instructions 1024. The term "machine-readable medium" shall also be taken to include any medium that is capable of storing instructions 1024 for execution by the machine and that cause the machine to perform any one or more of the methodologies disclosed herein. The term "machine-readable medium" includes, but not be limited to, data repositories in the form of solid-state memories, optical media, and magnetic media.

Additional Configuration Considerations

The disclosed configurations beneficially provide a method (and/or a system) for resolving concurrent transactions using deletion vectors. Without deletion vectors, concurrent transactions may fail to commit due to the conflicts introduced by intervening transactions, and the current transaction typically will have to start over from the most current version of the data table, resulting in wasted computing resources and time. By resolving concurrent conflicts in conjunction with deletion vectors associated with data files, the method presented herein may determine the serializability of the concurrent transactions and prevent many transaction operations from failing and having to be started over again, saving resources and cost for both the data processing service and the users of the data processing service.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

While particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined herein.

What is claimed is:

1. A method, comprising:
   starting execution of one or more processes for processing queries in a source executor node of a distributed computing engine configured for receiving and processing queries, the one or more processes including a runtime execution engine of a programming language used for implementing instructions for the processing queries;
   sending the queries to the source executor node for execution of the queries on the source executor node;
   performing checkpoint of the one or more processes executing on the source executor node to generate a checkpoint image, wherein the execution of the queries on the source executor node causes just-in-time compilation of at least a portion of code used for the processing queries, the just-in-time compilation causing generation of native instructions for the source executor node, wherein the native instructions are stored in the checkpoint image;
   storing the checkpoint image in a checkpoint image repository in the source executor node;
   providing the checkpoint image from the checkpoint image repository to a plurality of target executor nodes of the distributed computing engine;
   for each target executor node of the plurality of target executor nodes of the distributed computing engine, performing restore of checkpoint image to restore a check point image on said each target executor node of the plurality of target executor nodes based on the native instructions of the provided checkpoint image; and
   processing additional queries using the plurality of target executor nodes in the distributed computing engine to perform operations related to creation of data structures after the performing the restore of checkpoint image.

2. The method of claim 1, wherein the execution of the queries on the source executor node causes loading of classes used for execution of the queries, wherein the classes are stored in the checkpoint image.

3. The method of claim 1, wherein the execution of the queries on the source executor node causes initialization of variables and creation of data structures used for processing the queries, wherein the variables and data structures are stored in the checkpoint image.

4. The method of claim 1, wherein the checkpoint image repository stores a plurality of checkpoint images, each checkpoint image associated with a particular configuration of executor nodes.

5. The method of claim 4, wherein a configuration of an executor node is associated with one or more of: a CPU (central processing unit) type of the executor node, an amount of memory allocation of the executor node, or a version of a particular software running on the executor node.

6. The method of claim 1, further comprising:
generating a plurality of checkpoint images for a configuration of executor nodes, wherein different checkpoint images of the plurality of checkpoint images have different address space layouts.

7. The method of claim 1, further comprising:
responsive to restoring the checkpoint image on a target executor node, modifying one of more random numbers used by instructions for processing queries.

8. The method of claim 1, further comprising:
detecting a new configuration of an executor node;
triggering generation of a new checkpoint image corresponding to the new configuration; and
storing the new checkpoint image in the checkpoint image repository.

9. A non-transitory computer readable medium comprising stored instructions, the stored instructions when executed by at least one processor of one or more computing devices, cause the one or more computing devices to:
start execution of one or more processes for processing queries in a source executor node of a distributed computing engine configured for receiving and processing queries, the one or more processes including a runtime execution engine of a programming language used for implementing instructions for the processing queries;
send the queries to the source executor node for execution of the queries on the source executor node;
perform checkpoint of the one or more processes executing on the source executor node to generate a checkpoint image, wherein the execution of the queries on the source executor node causes just-in-time compilation of at least a portion of code used for the processing queries, the just-in-time compilation causing generation of native instructions for the source executor node, wherein the native instructions are stored in the checkpoint image;
store the checkpoint image in a checkpoint image repository in the source executor node;
provide the checkpoint image from the checkpoint image repository to a plurality of target executor nodes of the distributed computing engine;
for each target executor node of the plurality of target executor nodes of the distributed computing engine, perform restore of checkpoint image to restore a check point image on said each target executor node of the plurality of target executor nodes based on the native instructions of the provided checkpoint image; and
process additional queries using the plurality of target executor nodes in the distributed computing engine to perform operations related to creation of data structures after the performing the restore of checkpoint image.

10. The non-transitory computer readable medium of claim 9, wherein the execution of the queries on the source executor node causes loading of classes used for execution of the queries, wherein the classes are stored in the checkpoint image.

11. The non-transitory computer readable medium of claim 9, wherein the execution of the queries on the source executor node causes initialization of variables and creation of data structures used for processing the queries, wherein the variables and data structures are stored in the checkpoint image.

12. The non-transitory computer readable medium of claim 9, wherein the checkpoint image repository stores a plurality of checkpoint images, each checkpoint image associated with a particular configuration of executor nodes.

13. The non-transitory computer readable medium of claim 12, wherein a configuration of an executor node is associated with one or more of: a CPU (central processing unit) type of the executor node, an amount of memory allocation of the executor node, or a version of a particular software running on the executor node.

14. The non-transitory computer readable medium of claim 9, the instructions causing the one or more computing devices to:
generate a plurality of checkpoint images for a configuration of executor nodes, wherein different checkpoint images of the plurality of checkpoint images have different address space layouts.

15. The non-transitory computer readable medium of claim 9, the instructions causing the one or more computing devices to:
responsive to restoring the checkpoint image on a target executor node, modify one of more random numbers used by instructions for processing queries.

16. The non-transitory computer readable medium of claim 9, the instructions causing the one or more computing devices to:
detect a new configuration of an executor node;
trigger generation of a new checkpoint image corresponding to the new configuration;
and store the new checkpoint image in the checkpoint image repository.

17. A computer system, comprising:
a computer processor; and
a non-transitory computer-readable storage medium comprising instructions that when executed by the computer processor, cause the computer system to:
start execution of one or more processes for processing queries in a source executor node of a distributed computing engine configured for receiving and processing queries, the one or more processes including a runtime execution engine of a programming language used for implementing instructions for the processing queries;
send the queries to the source executor node for execution of the queries on the source executor node;
perform checkpoint of the one or more processes executing on the source executor node to generate a checkpoint image, wherein the execution of the queries on the source executor node causes just-in-time compilation of at least a portion of code used for the processing queries, the just-in-time compilation causing generation of native instructions for the source executor node, wherein the native instructions are stored in the checkpoint image;

store the checkpoint image in a checkpoint image repository in the source executor node;

provide the checkpoint image from the checkpoint image repository to a plurality of target executor nodes of the distributed computing engine;

for each target executor node of the plurality of target executor nodes of the distributed computing engine, perform restore of checkpoint image to restore a check point image on said each target executor node of the plurality of target executor nodes based on the native instructions of the provided checkpoint image; and process additional queries using the plurality of target executor nodes in the distributed computing engine to perform operations related to creation of data structures after the performing the restore of checkpoint image.

18. The computer system of claim 17, wherein the instructions further cause the computer system to:

detect a new configuration of an executor node;

trigger generation of a new checkpoint image corresponding to the new configuration;

and store the new checkpoint image in the checkpoint image repository.

19. The computer system of claim 17, wherein the execution of the queries on the source executor node causes loading of classes used for execution of the queries, wherein the classes are stored in the checkpoint image.

20. The computer system of claim 17, wherein the execution of the queries on the source executor node causes initialization of variables and creation of data structures used for processing the queries, wherein the variables and data structures are stored in the checkpoint image.

* * * * *

UNITED STATES PATENT AND TRADEMARK OFFICE
CERTIFICATE OF CORRECTION

PATENT NO. : 12,229,137 B1  
APPLICATION NO. : 18/412438  
DATED : February 18, 2025  
INVENTOR(S) : Ge et al.

Page 1 of 1

It is certified that error appears in the above-identified patent and that said Letters Patent is hereby corrected as shown below:

In the Claims

In Column 16, in Claim 1, Line 60, delete "check point" and insert -- checkpoint --, therefor.

In Column 17, in Claim 9, Line 67, delete "check point" and insert -- checkpoint --, therefor.

In Column 19, in Claim 17, Line 16, delete "check point" and insert -- checkpoint --, therefor.

Signed and Sealed this  
Twenty-second Day of July, 2025

Coke Morgan Stewart  
*Acting Director of the United States Patent and Trademark Office*